J. A. ANDERSON.
DROPPING MECHANISM FOR PLANTERS.
APPLICATION FILED FEB. 29, 1908.
911,691.
Patented Feb. 9, 1909.
2 SHEETS—SHEET 2.
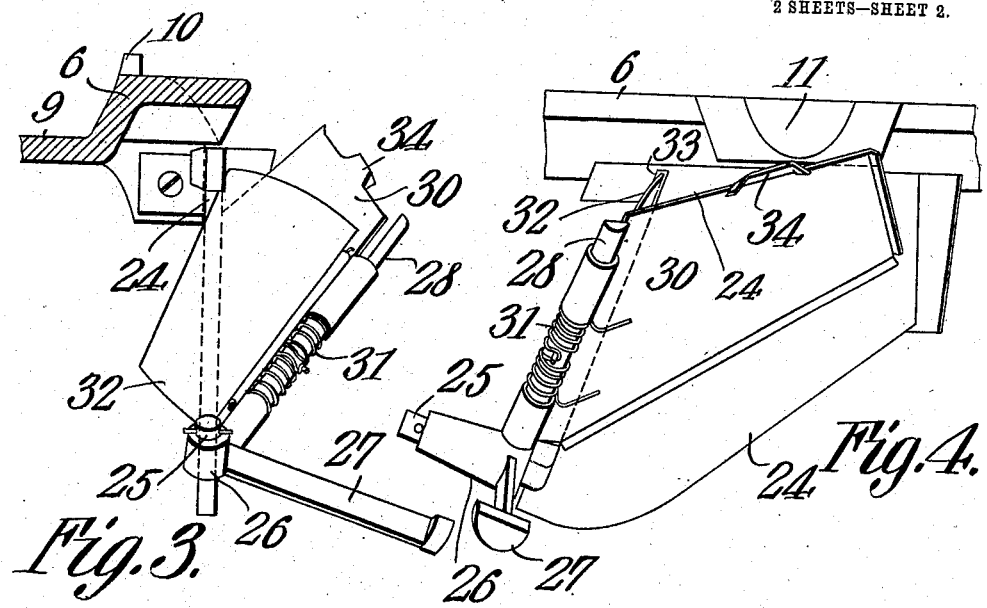
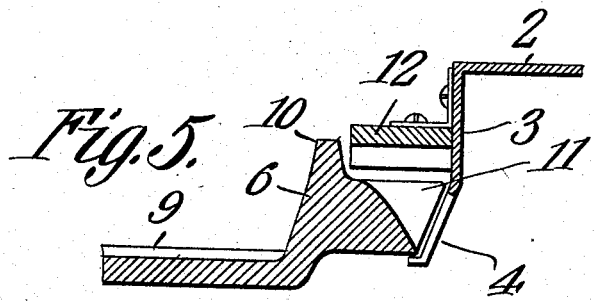
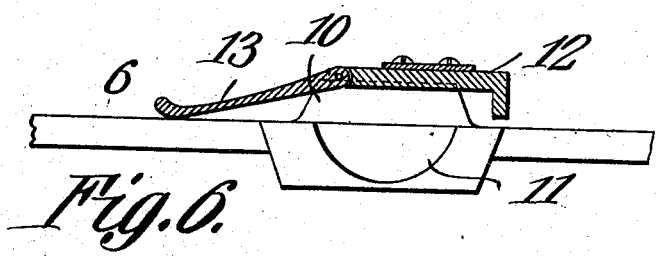
Witnesses
Inventor
John A. Anderson.
By
Attorneys

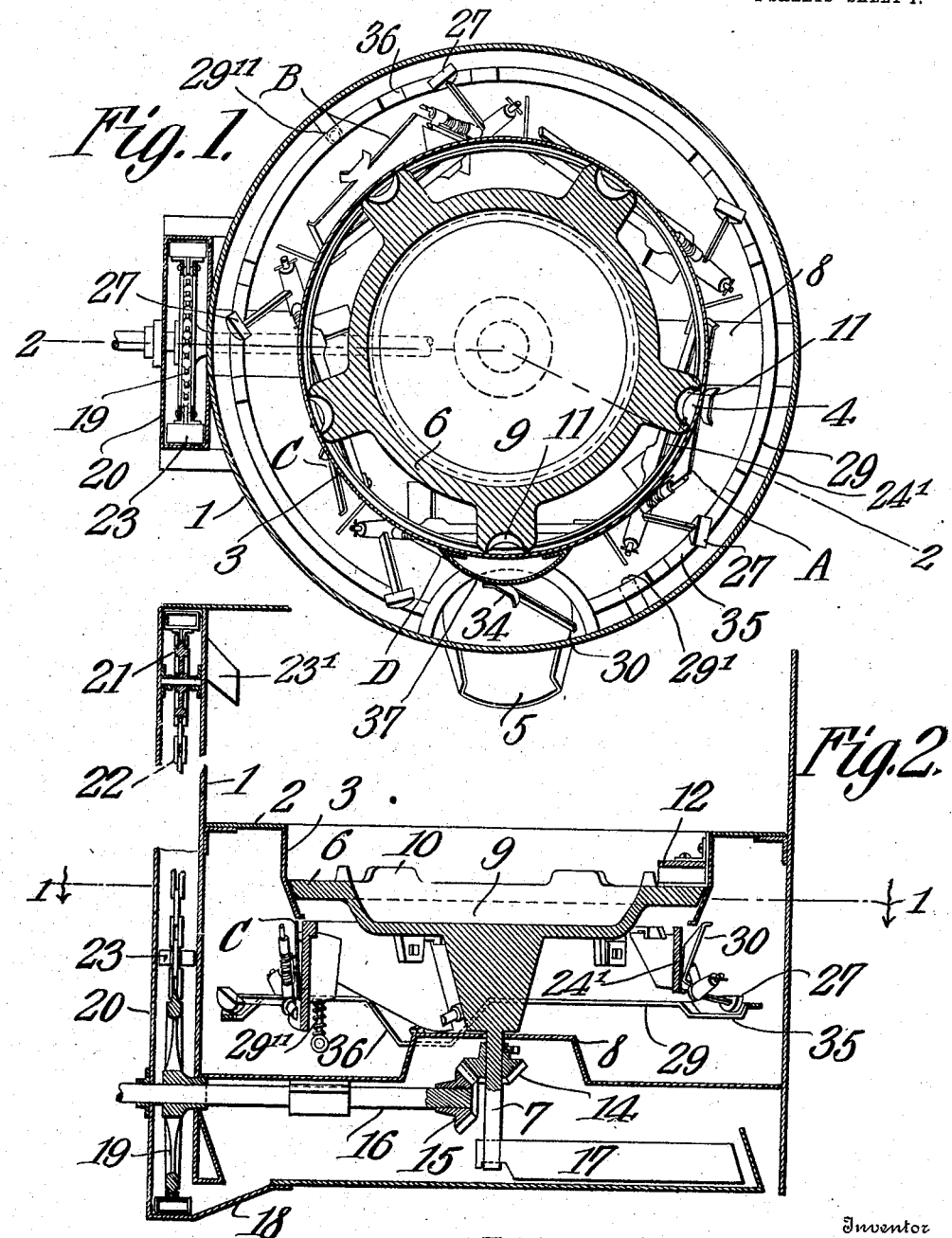

UNITED STATES PATENT OFFICE.

JOHN ALBERT ANDERSON, OF GENESEO, ILLINOIS.

DROPPING MECHANISM FOR PLANTERS.

No. 911,691.     Specification of Letters Patent.     Patented Feb. 9, 1909.

Application filed February 29, 1908. Serial No. 418,622.

*To all whom it may concern:*

Be it known that I, JOHN A. ANDERSON, a citizen of the United States, residing at Geneseo, in the county of Henry and State of Illinois, have invented a new and useful Dropping Mechanism for Planters, of which the following is a specification.

This invention has relation to dropping mechanism for planters and it consists in the novel construction and arrangement of its parts as hereinafter shown and described.

The object of the invention is to provide a simple and an effective mechanism for separating singly the seed grains from the bulk thereof and for dropping the separated grain at a proper interval whereby the said separated grain may fall from the planter into the furrow. The mechanism is so constructed as to receive several of the seed grains from the bulk of the grain contained within the seed box or hopper but all of the said grains with the exception of the selected or chosen one are rejected or passed into a receptacle provided for the rejected grain prior to the dropping of the selected grain. The seed grains which are rejected are returned from the receptacle into the seed box or hopper.

The mechanism may be used for separating seed of different sizes without necessitating the removal and substitution of parts to operate upon the different sizes of seed. The shape of the seed makes no difference in the separation nor does the character of seed interfere with the operation of the separating mechanism as the said mechanism is governed in its operation by the presence of the seed.

In the accompanying drawings: Figure 1 is a horizontal sectional view of the seed dropping mechanism cut on the line 1, 1 of Fig. 2. Fig. 2 is a vertical sectional view of the seed dropping mechanism cut on the line 2, 2 of Fig. 1. Fig. 3 is an end elevation of the seed separating mechanism. Fig. 4 is a side elevation of the same. Fig. 5 is a transverse sectional view of a hood used in the bottom of the seed box, and Fig. 6 is a longitudinal sectional view of said hood.

The seed box 1 is provided near its lower end with an annular ring 2 having a depending flange 3. The lower portion of the said flange is recessed or cut away as at 4 and the said recess is located to one side of the chute 5. The disk 6 is journaled for rotation within the flange 3 of the ring 2 and is mounted upon the spindle 7 which is journaled in the bracket 8 transversely disposed across the bottom of the box 1. Said disk is provided at its center with a concavity 9 at the edge of which is located a series of lugs 10. The disk is provided in its periphery with a series of recesses or cups 11, a lug 10 being located adjacent each of said recesses. The hood 12 is fixed to the flange 3 and lies over the path described by the recesses 11. The pivoted flap or cut off 13 (see Fig. 6) is attached to the forward end of the hood 12 and also lies with its free end over the path of the recesses 11. The beveled gear wheel 14 is fixed to the spindle 7 and meshes with the beveled gear wheel 15 which is fixed to the shaft 16. The said shaft 16 is journaled for rotation in the bottom portion of the seed box 1. The sweep 17 is attached to the lower end of the spindle 7 and is adapted to operate over the bottom of the seed box 1 for the purpose of forcing the rejected seed into the well 18 provided in the bottom of the seed box. The sprocket wheel 19 is mounted upon the shaft 16 and is located in the lower portion of the elevator casing 20 the lower end of which communicates with the well 18. The small sprocket wheel 21 is located in the upper portion of the elevator casing 20 and is in the same plane with the wheel 19. The endless chain 22 passes around the wheels 19 and 21 and said chain is provided with buckets 23 which are adapted to scoop up the rejected seed in the well 18 and elevate the same and cast them into the upper portion of the seed box 1 through the spout 23'.

A seed selector 24' is located below each of the recesses 11 and moves in an orbit with the disk 6. Each selector consists of a backing plate 24 having at its lower end a spindle 25. The sleeve 26 is journaled upon the spindle 25 and is provided with the arms 27 and 28. The outer ends of the arms 27 travel upon a track or flange 29 mounted in the bottom of the box 1 and having at different points sections at different elevations as hereinafter explained. The track 29 is supported at one side upon the pivot 29' and at its opposite side by the expansion spring 29''. As the said track or other parts wear the said spring will elevate the track to keep the same in proper engagement with the arms 27.

Each seed selector is provided with a plate 30 which is hinged upon the arm 28 and is under tension of the spring 31 which has a tendency to force the plate 30 toward the plate 24. The plate 32 forms an end plate for the selector and is hinged to the plate 30 and is adapted to move transversely across the end of the plate 24 it being guided in such movement by the slot 33 provided in the upper portion of the said plate 24. The plate 30 is provided at its upper edge with the lug 34.

The operation of the seed selector and dropper is as follows: The box 1 contains the seed and the shaft 16 is rotated by any suitable means. Through the instrumentality of the beveled pinions 15 and 14 rotary movement is transmitted to the disk 16. As the disk 6 having the recesses 11 rotate within the flange 3 they each receive several seed and as one of the said recesses passes under the hood 12 the seed located in the said recess are separated from the seed in the box 1 and the said hood keeps the weight of the seed in the box 1 off of the seed in the recess 11 under the hood. When the said recess passes under the hood the flap 13 packs the seed in the recess and also plows off or removes superfluous seed. When the seed selector is under the hood 12 the arm 27 of the said selector enters the depression 35 in the track 29 and the hinged plate 30 swings a slight distance away from the backing plate 24 into the position indicated by A in Fig. 1. Thus the seed in the recess 11 may fall through the recess 4 in the flange 3 and lodge between the plates of the seed selector. When the seed selector arrives at the position indicated by B in Fig. 1 the arm 27 enters the deeper depression 36 in the path 29 and the plate 30 swings further away from the plate 24 so that the seed may lodge between the lower portions of the said plate. When the selector moves into the position indicated by C in Fig. 1 the arm 27 rides upon the track 29 at its normal elevation and the plate 30 is forced toward the plate 24. At this point and at this time a single seed becomes wedged between the plates 24 and 30 and the plate 30 is held away from the plate 24 by the said wedged seed to such an extent as to permit the other seed to fall from between the said plates upon the bottom of the box 1. The selected seed, however, will be retained between the plates and carried around to the position indicated by D in Fig. 1 when the lugs 34 of the plate 30 will engage the bulge 37 and the plate 30 will be swung away from the plate 24 so that the selected seed is dropped in the chute 5. The seed which have been rejected and deposited upon the bottom of the hopper 1 are carried around by the sweep 17 and deposited in the well 18 from which point they are taken up by the buckets 23 and returned to the upper portion of the box 1 as before described.

Thus it will be seen that the prime object of the invention is to provide a separator which may be used without alteration indiscriminately for separating seed of different sizes as it will operate in the same manner without requiring adjustment of seed as large as maize or Indian corn or pop corn or even seed of greater difference in diametrical dimensions.

Having described my invention, what I claim as new and desire to secure by Letters Patent is:

1. In a device of the character indicated a seed separator comprising a backing plate, an arm pivoted thereon, means for swinging said arm, a plate hinged upon the arm and bearing against the back of the plate and a plate transversely disposed with relation to the backing plate and hinged plate and being hingedly connected with one of said plates and slidably engaging the other plate.

2. In a device of the character indicated, a seed separator comprising a backing plate, an arm pivoted thereon, a plate hinged upon said arm and being held in engagement with the backing plate under spring tension, an end plate transversely disposed with relation to the first said plate and being hingedly connected to one and slidably engaging the other.

3. In a device of the character indicated, an orbitally moving seed separator adapted to receive a collection of seed and separate a single seed therefrom and reject the balance, an arm for operating the separator, a path upon which said arm travels, said path having sections at different elevations for moving said arm to operate the separator.

4. In a device of the character indicated, a seed separator comprising a backing plate, a collar pivotally mounted thereon, divergent arms carried by the collar, a fixed path over which one of said arms travels, a side plate hingedly attached to the other arm and an end plate transversely disposed with relation to the backing and side plates and being hingedly connected with one and slidably engaging the other.

5. In a device of the character indicated, a seed separator comprising a backing plate, a side plate mounted for movement so that the angle between its plane and the plane of the backing plate may be increased or diminished.

6. In a device of the character indicated, a seed separator comprising a backing plate, a side plate mounted adjacent the backing plate and having two separate swinging movements with relation to the same.

In testimony that I claim the foregoing as my own, I have hereto affixed my signature in the presence of two witnesses.

JOHN ALBERT ANDERSON.

Witnesses:
Wm. H. Vincent,
C. L. Nelson.